(12) United States Patent
Smith et al.

(10) Patent No.: US 6,875,383 B2
(45) Date of Patent: Apr. 5, 2005

(54) METHOD AND APPARATUS FOR INJECTION MOLDING

(75) Inventors: Doug Smith, Vandalia, OH (US); David Voisard, Troy, OH (US)

(73) Assignee: MHI Injection Moulding Machinery, Inc., Bensenville, IL (US)

( * ) Notice: Subject to any disclaimer, the term of this patent is extended or adjusted under 35 U.S.C. 154(b) by 313 days.

(21) Appl. No.: 10/037,648

(22) Filed: Jan. 3, 2002

(65) Prior Publication Data
US 2003/0122272 A1 Jul. 3, 2003

(51) Int. Cl.[7] .............................................. B29C 45/77
(52) U.S. Cl. ............... 264/40.5; 264/297.2; 264/328.8; 425/145; 425/146; 425/149; 425/572
(58) Field of Search ............................... 264/40.1, 40.5, 264/328.8, 297.2; 425/145, 149, 572, 573, 588, 146

(56) References Cited

U.S. PATENT DOCUMENTS

| | | | |
|---|---|---|---|
| 4,017,237 A | * 4/1977 | Webster | ..................... 425/562 |
| 4,318,874 A | 3/1982 | Lemelson | |
| 5,135,703 A | * 8/1992 | Hunerberg et al. | ......... 264/572 |
| 5,375,991 A | 12/1994 | Rydmann et al. | |
| 5,395,565 A | 3/1995 | Nagaoka et al. | |
| 5,766,526 A | 6/1998 | Watanabe | |
| 5,902,534 A | 5/1999 | Fujishiro et al. | |
| 5,919,492 A | * 7/1999 | Tarr et al. | ................ 264/328.8 |
| 6,013,211 A | 1/2000 | Seki | |
| 6,030,203 A | 2/2000 | Kuroda | |
| 6,632,079 B1 | * 10/2003 | Kazmer et al. | ............. 425/145 |

OTHER PUBLICATIONS

Dynisco HotRunners, "Dynamic Feed™ The Next Generation in Injection Molding Process Control" pamphlet, undated.

Mitsubishi Heavy Industries, Ltd., "Mitsubishi Injection Molding Machine MJ Series" pamphlet, undated.

* cited by examiner

Primary Examiner—Jill L. Heitbrink
(74) Attorney, Agent, or Firm—Brinks Hofer Gilson & Lione

(57) ABSTRACT

A multi-cavity injection molding method and device, and a controller for sequentially injecting material into cavities in the injection molding device. The methods and devices are effective to reduce the clamping force needed to clamp multiple cavity molds.

45 Claims, 5 Drawing Sheets

METHOD AND APPARATUS FOR INJECTION MOLDING

BACKGROUND

The present invention relates to a method and apparatus for injection molding, and in particular, to a method and apparatus for molding injection molded parts.

Conventionally, a variety of methods have been utilized for injection molding in various fields. Of these methods, a molding metal mold of a runnerless (hot runner) system has been widely used.

There are a variety of molds in such a hot runner system. Smaller molds generally only require one inlet for injecting molten material. For larger molds, several inlets are used to inject molten material at different points within the mold cavity. These larger molds are sometimes referred to as multi-gate mold cavities. In multi-gate mold cavities, the pressure of molten material differs at various points inside the cavity. The pressure typically becomes constant throughout the cavity once the cavity is completely filled with molten material.

A conventional molding process can be done using power from hydraulic means or electrical means. The molding process uses two platens, a movable platen and a stationary platen. In a process using hydraulic means, a hydraulic cylinder applies a certain force to push a movable platen against a stationary platen. Molding members within or attached to the platens form a molding cavity. The force is maintained on the stationary platen or die plate while a molten material is injected into the molding cavity. The molten material is injected into the cavity with a resin feeding screw until the pressure inside the cavity reaches a predetermined molding pressure or until the screw has moved a predetermined distance and for a set period of time, thereby ensuring that the cavity is filled. After injecting the molten material, the molten material is allowed to cool and solidify, the force is then released, and the plates are separated and the process begins anew.

Some injection molding machines use a mold with only one cavity, thereby allowing for the production of one molded object per cycle. Total cycle time is the sum of the fill time and the cool down time. The cool down time is generally substantially longer than the fill time. For example, a typical fill time is about 5 seconds, whereas a typical cooling time is about 30 seconds, for a total of about 35 seconds for the production of one molded article.

To reduce process time per molded article, some injection molding machines utilize molds with a plurality of cavities for forming a plurality of molded articles. The molten material fills into each of the cavities simultaneously. While this may extend the fill time a few seconds, for example for mold cavities for car doors, to about 8 seconds, the cooling time remains fixed at about 40 seconds. The total time of this process is about 48 seconds for the production of two molded articles. Thus, using multiple cavities increases the efficiency almost two-fold.

A problem with the multiple cavity method, however, is that the mold clamping force must also be doubled since the article molding area is doubled. As a result, a larger injection molding machine must be used to apply the extra force needed to hold the molding platens together. A larger injection molding machine costs more, takes up more floor space, and requires more power. Therefore, using multiple cavity molds with the conventional method can sacrifice cost for greater time efficiency.

Furthermore, for molding larger articles, the molten material is injected at several different points in the mold cavity. This is due to the limits on the flow of molten plastic. These larger mold cavities are commonly known as multi-gate mold cavities. An example of an article that would require a multi-gate mold cavity is an interior car door panel, which typically requires four or five gates per single cavity mold. In the manufacture of such parts, it is desirable to maintain the injected pressure of the molten material constant so that the part is formed accurately. Without maintaining the pressure constant, the structural accuracy of the formed part may suffer. For example, the resulting part may include short shots, ripples, or other dimensional inaccuracies. As such, there is a need to be able to accurately measure the pressure of molten plastic inside of the mold cavity.

Accordingly, a general object of the present invention is to provide an injection molding machine and a method for injection molding either large or small articles where there is process control for each cavity.

A further object of the present invention is to provide an injection molding machine and a method for injection molding large articles with greater efficiency and reduced costs.

BRIEF SUMMARY

In one aspect, the invention is a method for sequentially injecting a molten material comprising clamping a stationary platen and a movable platen at a clamping force to define at least two cavities, opening a first valve gate to inject a molten material into a first cavity, closing the first valve gate either by position, time or pressure switch, opening a second valve gate to inject the molten material into a second cavity, and closing the second valve gate when the desired position, time or pressure switch value has been met.

In a second aspect, the invention is an injection molding apparatus comprising a mold having at least two mold cavities, a molten material inlet system in communication with said at least two mold cavities, at least two valve gates in said molten material inlet, wherein each of said at least two valve gates are associated with one of said mold cavities; and a controller adapted to sequentially open and close said valve gates.

In a third aspect, the invention is a controller for use with a injection molding device having a mold with at least two cavities, the controller comprises means for opening a first valve gate associated with a first mold cavity to initiate a flow of molten material into the first mold cavity, means for closing the first valve gate by either position, time or pressure switch, means for opening a second valve gate associated with a second cavity to initiate a flow of molten material into a second mold cavity, and means for closing the second valve gate by either position, time or pressure switch.

Other objects, features and advantages of the present invention will become apparent from the following detailed description. It should be understood, however, that the detailed description and the specific examples, while indicating embodiments of the invention, are given by way of illustration only, the invention being defined only by the claims following this detailed description.

BRIEF DESCRIPTION OF SEVERAL VIEWS OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE PREFERRED EMBODIMENTS

Figure 1:
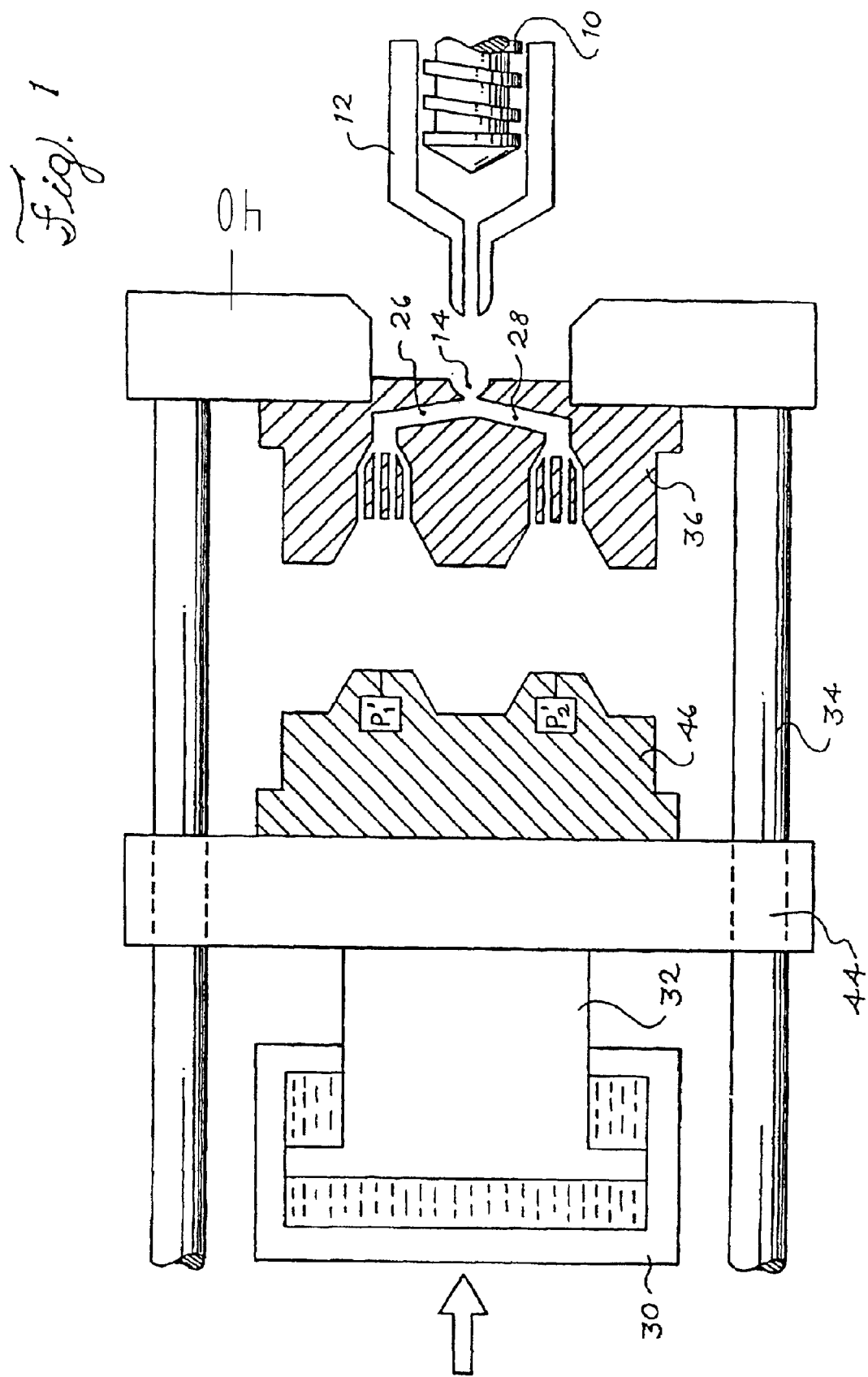
FIG. 1 is a schematic view of an injection molding apparatus suitable for the method of injection molding a molten material, provided by the present invention.

First, the injection molding apparatus suitable for use in the method of injection-molding a thermoplastic or thermoset resin, provided by the present invention, will be outlined below with reference to FIG. 1. Although the injection molding apparatus described and shown in FIG. 1 uses hydraulic power, one of ordinary skill in the art would recognize that an electrically powered molding apparatus can also be used for the present invention. The injection molding apparatus includes an injection cylinder 12 having a resin-feeding screw or extrusion screw 10 inside, a stationary platen 40, a movable platen 44, an inlet 26, tie bars 34, a clamping hydraulic cylinder 30 and a hydraulic piston 32. The movable platen 44 is actuated with the hydraulic piston 32 in the hydraulic cylinder 30 to move in parallel on the tie bars 34.

A mold is formed by a stationary mold member 36 and a movable mold member 46. The stationary mold member 36 is attached to the stationary platen 40, and the movable mold member 46 is attached to the movable platen 44. The platens 40, 44, the tie bars 34, and the cylinder 30 and piston 32 define a clamping system for applying a clamping pressure to the mold members 36, 46. The movable platen 44 is moved towards the stationary platen 40 until the movable mold member 46 is engaged with the stationary mold member 36, and the mold is clamped to form multi-gate cavities 22, 24. This clamped position is illustrated in FIG. 2.

After the mold has been clamped, the clamping force is controlled with the clamping hydraulic cylinder 30. The clamping force may also be controlled by toggle or an electric machine. The molten material flows into the cavities 22, 24 via inlets 26. Valve gates 50, 52 may be used, but are not necessary, to open and close inlets 26. If used, valve gates 50, 52 would face cavities 22, 24 and at least one valve gate is associated with each cavity 22, 24 respectively. After the molten material cools and hardens, the clamping force is released and the movable platen 44 is moved away from the stationary platen 40, in order to release the molded product.

Figure 2:
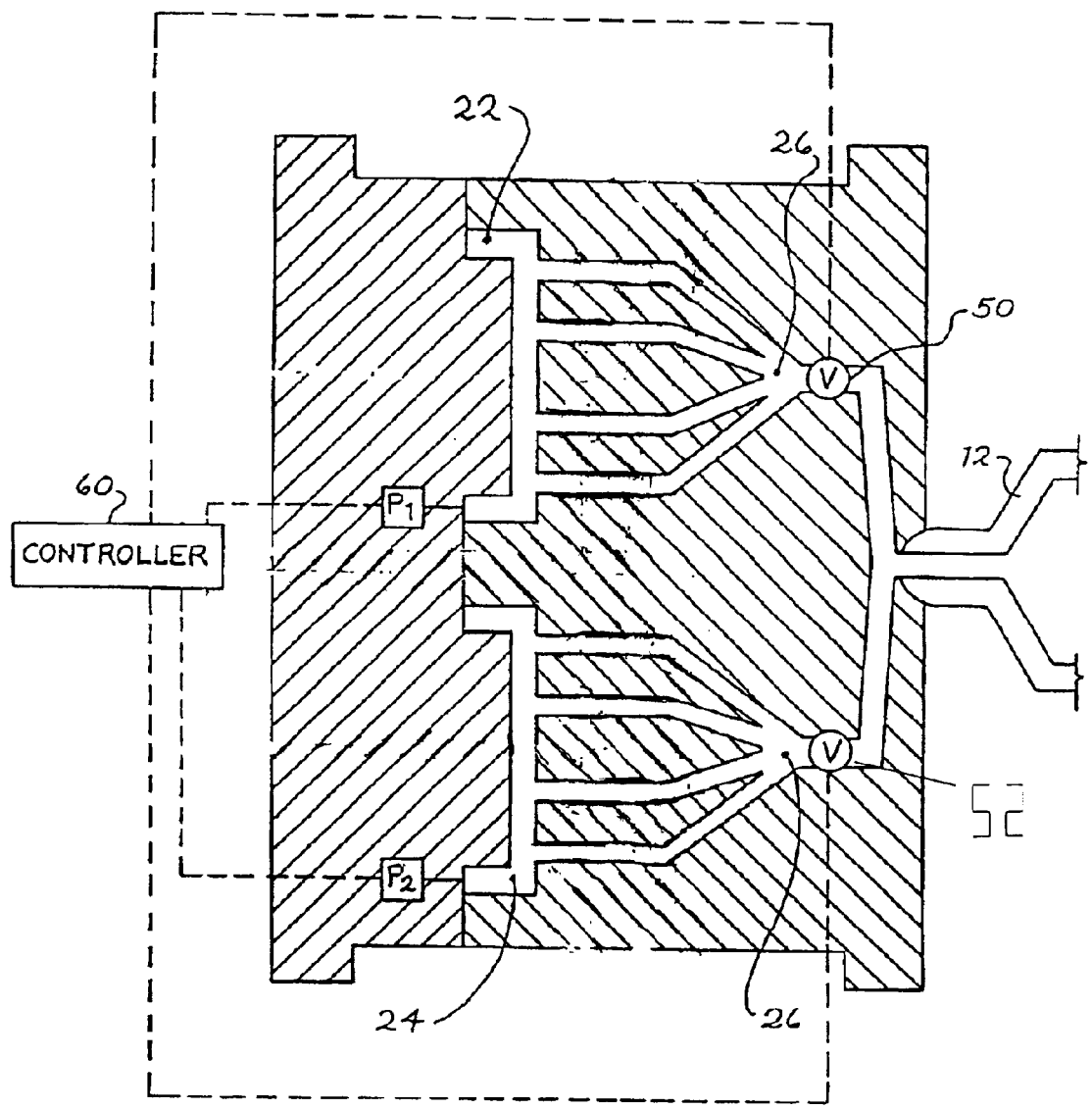
FIG. 2 is a schematic view of a part of the injection molding apparatus showing a state immediately after clamping the mold, and a state in which the introduction of the molten material is initiated, in the method of injection molding, provided by the present invention.

For the exemplary two-cavity multi-gate mold shown in FIG. 2, the sequential injection molding method begins with clamping the mold with at a mold clamping force. The controller 60 then closes valve gate 52 and opens valve gate 50. Molten material fills cavity 22. The amount of material that enters the cavity may be controlled by the use of pressure transducers P1, P2 or preferably can be controlled by predetermining the distance or time the resin feeding screw 10 must travel to fill cavity 22. Conventional molding processes use the position of the resin feeding screw 10 to control the amount of material being injected into the mold cavity and to ensure that the cavity is full and packed. Sometimes, the time the screw travels is the controlling variable in filling the cavity.

As molten material enters through the inlet, it gradually fills the entire cavity. A stroke sensor or potentiometer 65 measures the distance resin feeding screw 10 has moved and transmits this reading to the controller 60. The controller 60 uses the data from the stroke sensor and/or a timer to determine when to close valve gate 50 to stop the flow of molten material into cavity 22 and open valve gate 52 to start the flow of molten material into cavity 24. The controller closes valve gate 50 when the resin feeding screw has traveled a pre-determined distance or for a predetermined period of time. If no hold pressure is used in molding the article, the valve gate 50 is closed at the switchover point which is the point when the entire cavity gets filled with molten material and begins to exert a pressure on the cavity. If a hold pressure is used, the valve gate is kept open for a fixed period of time after the molten material has filled the entire cavity and the resin feeding screw exerts a holding pressure. After the fixed period of time the valve gate 50 is closed. If pressure transducers are used, the controller closes valve gate 50 and opens valve gate 52 when the pressure inside the cavity reaches a set point pressure. The controller opens valve gate 52 and the resin feeding screw may then retreat back or may continue from its end position depending on whether or not there is enough material in the injection chamber to fill the second cavity 24. In a preferred embodiment, the pressure exerted by the resin feeding screw is decreased between the closing of valve gate 50 and the opening of valve gate 52. In the alternative, the screw is activated after delay time of about 0.5 seconds after opening valve gate 52. This prevents a sudden high pressure shot upon the opening of valve gate 52 and provides greater control of the process. Molten material then fills into cavity 24. When the resin feeding screw 10 has moved the predetermined distance or time to fill and pack cavity 24, the molten material is held inside cavities 22, 24 and is allowed to cool and solidify. At this point, valve gate 52 may be left open if there are no additional mold cavities to be utilized, otherwise the controller closes valve gate 52 and the process repeats.

Figure 3:
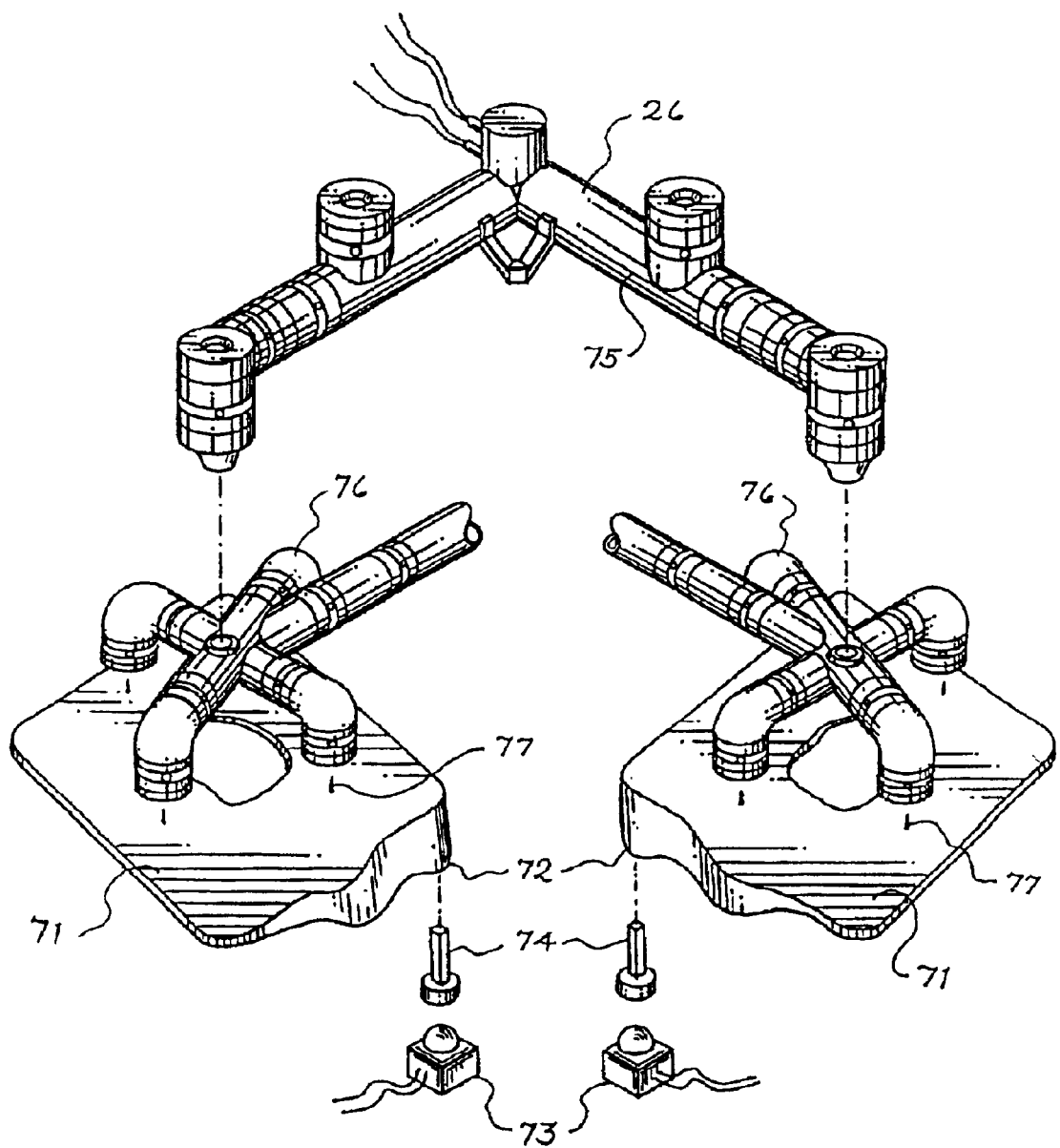
FIG. 3 is a perspective view of a part of the injection molding apparatus showing a multi-gate injection molding system with multiple multi-gate molds, in the method of injection molding, provided by the present invention.

FIG. 3 shows a perspective view an embodiment of the multiple multi-gate mold injection system of the present invention. In particular, there are two multi-gate mold cavities for interior car door panels 71. Molten material enters into the main inlet 75 and then flows into the multi-drop hot manifold 76 that has inlets at various points in the mold cavity. Pressure transducers 73 may be placed inside the cavity, preferably at the end of fill point 72, to measure the pressure inside the cavity. Ejector pins 74 release the molded article once the molten material cools and solidifies.

Figure 4:
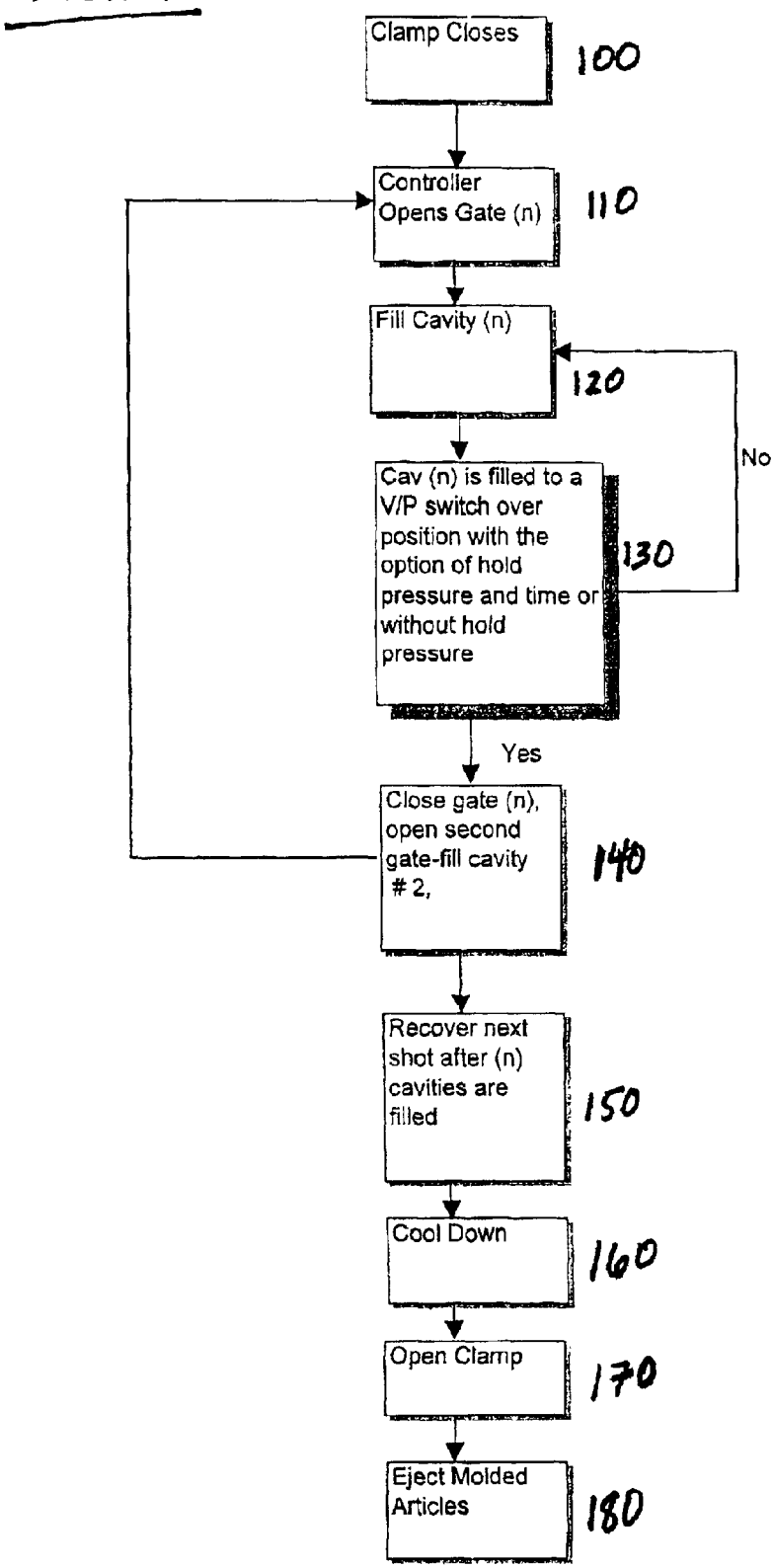
FIG. 4 is a flowchart illustration of the sequential injection molding process of the present invention.

FIG. 4 is a flowchart illustration of the sequential injection molding process of the present invention. It will be understood that each step of the flowchart illustration can be implemented by computer program instructions or can be done manually. These computer program instructions may be loaded onto a computer or other programmable data processing apparatus to produce a machine, such that the instructions which execute on the computer or other programmable data processing apparatus create means for implementing the functions specified in the flowchart step. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart step. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart step.

It will be understood that each step of the flowchart illustration can be implemented by special purpose hardware-based computer systems which perform the specified functions or steps, or combinations of special purpose hardware and computer instructions, or can be done manually.

An injection molding machine utilizing a sequential injection molding process has a plurality of multi-gate mold cavities formed by the movable mold member 46 and the stationary mold member 36. For an injection molding machine with m cavities, where n equals 1 to m, the process begins with step 100 by closing the clamp with a mold clamping force calculated by the equation:

mold clamping force required=(clamp tonnage required per square inch)×(surface area of cavity *n*)

The clamp tonnage is predetermined and is calculated based upon the type of molding material and the desired characteristics of the molded article. For example, an ABS material may require two to three tons of pressure per square inch of area. Other materials require different amounts of pressure. In step 110, a first valve gate is opened which faces a first cavity. The first cavity is then injected with molten material using a resin-feeding screw at a predetermined injection velocity in step 120. The injection velocity may be changed or may be kept constant as the cavity becomes filled with molten material. The time it takes to fill the cavity to the V/P change over position or the set-point pressure depends on the size of the cavity and the injection velocity. In a preferred embodiment, the injection velocity is varied and it takes about one second to about ten seconds to fill the cavity to the set-point pressure or V/P change over position. In step 130, the controller monitors the distance, time and/or velocity at which the resin screw has moved and compares it to the set-point values said screw must move in order for molten material to fill the cavity or reach the velocity to pressure (V/P) switch point. The V/P switch point occurs when the molten material has fully filled the cavity and begins to exert a pressure inside the cavity. In one embodiment, if a predetermined holding pressure at which the material must be held is used, resin feeding screw exerts a holding pressure for a predetermined time before the controller closes the valve gate to the cavity. The process goes back to step 120 if the cavity is not full or has not reached the V/P switch point if there is no holding pressure, or has not reached a predetermined holding pressure if using holding pressure or has not reached the pressure switch set value. The first valve gate is closed once the cavity is full if not using holding pressure or once it is full and has been held for a predetermined period of time at a holding pressure or has reached the pressure switch set value in step 140. The process goes back to step 110 and repeats for n cavities. After all of the cavities are full, the machine recovers for the next shot in step 150 the molten material inside the cavities is allowed to cool and solidify in step 160. The cooling process takes about 20 seconds to about 40 seconds, depending upon the size of the molded article and the type and temperature of the molded material. After cooling, the mold clamping force is released and the clamp is opened in step 170. The sequential injection molding process ends with step 180, when the molded articles are ejected from the molding cavities.

The mold clamping force required is reduced significantly in a sequential injection molding process for a multiple cavity mold. This is because the area to be pressurized does not increase when there are multiple cavities. For a mold with multiple cavities, the area to be pressurized remains constant and equals the area of one cavity since each cavity in the mold is pressurized and closed sequentially. Therefore, the mold clamping force required in a two-cavity mold is reduced to almost half by using the sequential injection molding method compared to a conventional method. The mold clamping force required in a three-cavity mold the force required is reduced by over fifty percent compared to the force required in the conventional method. This significant reduction in mold clamping force allows for a reduction in the press size, which in turn allows for dramatic cost savings in terms of production cost per molded article.

Figure 5:
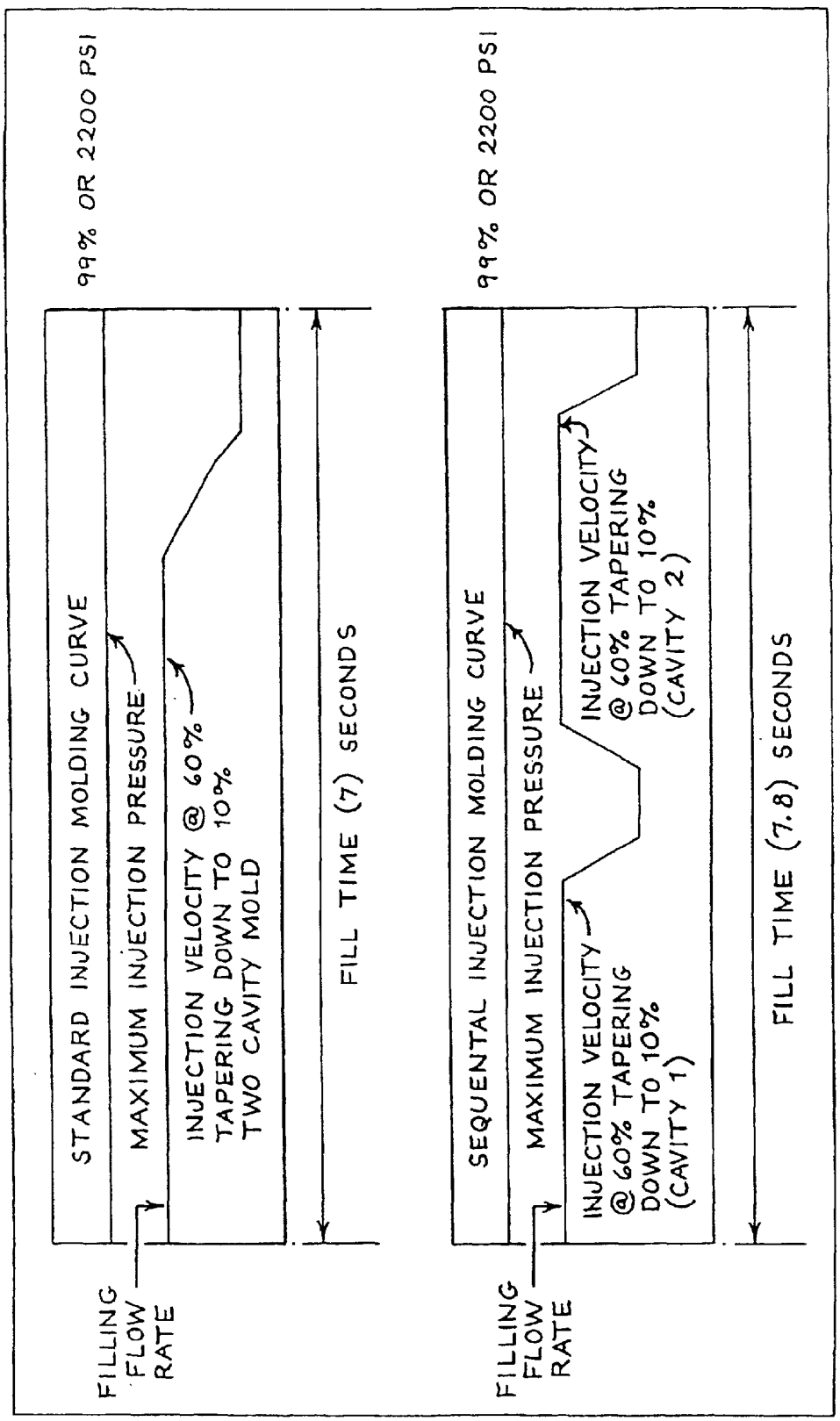
FIG. 5 schematically shows a change in injection velocity with time for a conventional injection molding method and a sequential injection molding method.

FIG. 5 shows how the injection velocity varies during the step of filling a cavity for a standard injection molding process compared to a sequential injection molding process in a two-cavity mold. The injection velocity is controlled by the machine set-point of the resin-feeding screw 10. In a standard injection molding process the cavities are filled with molten material simultaneously and in the sequential method the cavities are filled sequentially. Both processes may be carried out with more than two cavities. The sequential molding process, however, has at least two cavities.

In a standard injection molding process, the injection pressure is set above the necessary pressure requirement to fill the mold cavity. The injection velocity of the molten material is set at a filling flow rate prior to the valve gate being opened. As illustrated in FIG. 5, the injection velocity is kept at filling flow rate until the cavities are almost full. The injection velocity is then gradually tapered down from the filling flow rate so that the injection velocity of the molten material can be controlled to allow proper fill of the entire cavity. Once the pressure inside the cavity reaches the set-point molding pressure, the injection velocity is brought down to zero or if molding by position when the cavity reaches the desired fill level. Decreasing the injection velocity ensures that the molten material is uniform inside the cavities, thereby yielding a higher quality molded article.

In the sequential injection molding process, the injection pressure is set above the necessary pressure requirement to fill the mold cavity. This pressure requirement is dependent on the physical properties of the molten material such as its viscosity. The injection velocity of the molten material is set at a filling flow rate when a valve gate is opened. The injection velocity is kept at the filling flow rate until a cavity is almost full and then gradually tapered down until the cavity is full at the switchover point or if holding pressure is utilized until the hold timer times out. The difference in the sequential method compared to the standard method, is that the injection velocity is increased again to the filling flow rate when the second valve gate is opened. This adds approximately 0.5 seconds to about 4 seconds to the total fill-time for the process. In a preferred embodiment, the ramp up of the injection velocity to the filling flow rate is rapid so that the total process time does not increase significantly.

It is contemplated that numerous modifications may be made to the injection molding method and apparatus of the present invention without departing from the spirit and scope of the invention as defined in the claims. For example, while the exemplary embodiment shown in the drawings has two multi-gate mold cavities, those skilled in the art will appreciate that the same sequential steps can be used to control the flow of molten material into molds having more than two cavities. In addition, for molds having more than two cavities, there may be a valve gate associated with each cavity, with each valve gate opened and closed sequentially. Alternately, for molds having more than two cavities, there may be fewer valve gates than cavities, as long as there are at least two cavities. In this embodiment, at least one of the valve gates would control the inlet to at least two cavities. Accordingly, while the present invention has been described herein in relation to several embodiments, the foregoing disclosure is not intended or to be construed to limit the present invention or otherwise to exclude any such other embodiments, arrangements, variations, or modifications and equivalent arrangements. Rather, the present invention is limited only by the claims appended hereto and the equivalents thereof.

What is claimed is:

1. A method for sequentially injecting a molten material comprising:

clamping a stationary platen and a movable platen at a clamping force to define at least two mold cavities;

injecting a molten material into a first mold cavity at a fill rate to fill and pack said cavity with said molten material, said molten material being injected into said first mold cavity by an injection pressure that is applied to said molten material;

holding molten material in said first mold cavity;

injecting molten material into a second mold cavity to fill and pack said cavity with said molten material; and holding molten material in said second mold cavity, wherein the injection pressure that is applied to the molten material during the step of injecting the molten material into the first mold cavity is reduced before commencing the step of injecting the molten material into the second mold cavity.

2. The method of claim 1 wherein molten material is held in said mold cavities at said clamping pressure until said material cools and solidifies into molded articles.

3. The method of claim 1 wherein a hydraulic cylinder, toggle, or electric machine is used to clamp the stationary platen and the movable platen at said clamping force.

4. The method of claim 1 wherein a valve gate faces each of said mold cavities.

5. The method of claim 4 wherein the valve gates are controlled independently of each other by a control unit.

6. The method of claim 1 wherein the amount of molten material injected into said cavity is monitored by a control unit that receives signals from a stroke sensor associated with a resin feeding screw.

7. The method of claim 1 wherein the mold cavities are multi-gate mold cavities.

8. The method of claim 5 wherein the control unit starts and holds injection of molten material into said cavities based on signals transmitted by said stroke sensor or a timer or pressure switch to the control unit.

9. The method of claim 1 wherein the fill rate of injection of said molten material is reduced from a filling flow rate when molten material in said first cavity reaches a velocity to pressure switchover point and is then increased to the filling flow rate when said second mold cavity is injected with said molten material.

10. The method of claim 4 wherein said valve gate is closed when said molten material in said cavity reaches a velocity to pressure switchover point.

11. The method of claim 4 wherein said valve gate is closed when said molten material in said cavity has been held at a holding pressure for a period of time.

12. The method of claim 1 wherein no holding pressure is used during said steps of holding molten material inside said first and second cavities.

13. The method of claim 1 wherein the injection pressure that is applied to the molten material during the step of injecting the molten material into the first mold cavity is substantially eliminated before commencing the step of injecting the molten material into the second mold cavity.

14. A method for injection molding articles comprising the sequential steps of:

a) providing an injection molding machine with a plurality of mold cavities;

b) injecting a molten material into a first mold cavity at a first fill rate until the first mold cavity is substantially filled with molten material or until the molten material inside said first mold cavity reaches a set-point holding pressure;

c) reducing or eliminating an injection pressure applied to said molten material;

d) injecting said molten material into a second mold cavity at a second fill rate until the second mold cavity is substantially filled with molten material or until the molten material inside said second mold cavity reaches a set-point holding pressure;

e) holding said molten material at said set-point pressure inside said plurality of mold cavities until said molten material cools and solidifies into molded articles; and f) ejecting said molded articles from said injection molding machine.

15. The method of claim 14 wherein molten material is held in said mold cavities at a clamping pressure until said material cools and solidifies into molded articles.

16. The method of claim 14 wherein a valve gate faces each of said plurality of mold cavities.

17. The method of claim 16 wherein the valve gates are controlled independently of each other by a control unit.

18. The method of claim 14 wherein the pressure inside the mold cavities is measured by pressure transducers associated with said cavities.

19. The method of claim 14 wherein said fill rate is measured by a stroke sensor associated with a resin feeding screw.

20. The method of claim 14 wherein the mold cavities have multiple inlets.

21. The method of claim 17 wherein the control unit starts and holds injection of molten material into said cavities based on signals transmitted by one or both a stroke sensor or pressure transducers.

22. The method of claim 14 wherein said molten material is injected into said plurality of mold cavities by a resin feeding screw.

23. The method of claim 14, wherein the fill rate of injection of said molten material is reduced from a filling flow rate when the molten material in said first cavity is substantially full or reaches a holding pressure and is subsequently increased to the filling flow rate when said second mold cavity is injected with said molten material.

24. A method for injection molding articles comprising:
   a) providing an injection molding machine with a plurality of mold cavities and a resin feeding screw;
   b) injecting a molten material into a first mold cavity at a first fill rate until said first mold cavity approaches a velocity to pressure switchover point, said molten material being injected by a first injection pressure that is applied to the molten material by the resin feeding screw;
   c) reducing the first injection pressure that is applied to the molten material by the resin feeding screw;
   d) injecting said molten material into a second mold cavity at a fill rate until the second mold cavity approaches a velocity to pressure switchover point, said molten material being injected by a second injection pressure that is applied to the molten material by the resin feeding screw;
   e) holding said molten material inside said plurality of mold cavities until said molten material cools and solidifies into molded articles; and
   f) ejecting said molded articles from said injection molding machine.

25. The method of claim 24 wherein said molten material is injected into said plurality of mold cavities using said resin feeding screw.

26. The method of claim 24 wherein prior to said step of injecting said molten material into the second mold cavity, a valve gate associated with said second mold cavity is opened.

27. The method of claim 24 wherein the step of reducing or eliminating the first injection pressure that is applied to the molten material by said resin feeding screw has a duration of within about 0.5 seconds.

28. The method of claim 24 wherein during step c), the first injection pressure that is applied to the molten material by the resin feeding screw is eliminated.

29. A method for injection molding articles comprising:
   a) providing an injection molding machine with a plurality of mold cavities and a resin feeding screw;
   b) injecting a molten material into a first mold cavity at a first fill rate until said first mold cavity is substantially filled and said molten material is held at a holding pressure for a period of time, said molten material being injected by a first injection pressure that is applied to the molten material by the resin feeding screw;
   c) closing said first mold cavity;
   d) reducing the first injection pressure that is applied to the molten material by the resin feeding screw;
   e) opening a second mold cavity;
   f) injecting said molten material into said second mold cavity at a second fill rate until the second mold cavity is substantially filled and said molten material is held at a holding pressure for a period of time, said molten material being injected by a second injection pressure that is applied to the molten material by the resin feeding screw;
   g) closing said second mold cavity;
   h) holding said molten material inside said plurality of mold cavities until said molten material cools and solidifies into molded articles; and
   i) ejecting said molded articles from said injection molding machine.

30. The method of claim 29 wherein said molten material is injected into said plurality of mold cavities using said resin feeding screw.

31. The method of claim 30 wherein the step of reducing or eliminating the first injection pressure that is applied to the molten material by said resin feeding screw has a duration of within about 0.5 seconds.

32. The method of claim 29 wherein during step d), the first injection pressure that is applied to the molten material by the resin feeding screw is eliminated.

33. A method for injection molding articles comprising:
   a) providing an injection molding machine with a plurality of mold cavities, a resin feeding screw, and a stroke sensor for monitoring the position of the resin feeding screw, the stroke sensor transmitting screw position data to a controller, wherein said resin feeding screw is at a screw starting position, further wherein the controller indicates a first cavity starting position;
   b) injecting a molten material into a first mold cavity at a first fill rate until said first mold cavity approaches a first velocity to pressure switchover point, wherein said resin feeding screw is at a first cavity ending position at said switchover point, further wherein said controller indicates a first cavity filled position;
   c) re-setting said controller from the first cavity filled position to a second cavity starting position;
   d) injecting said molten material into a second mold cavity at a second fill rate until the second mold cavity approaches a second velocity to pressure switchover point, wherein said resin feeding screw is at a second cavity ending position at said switchover point, further wherein said controller indicates a second cavity filled position;
   e) moving said resin feeding screw back to said screw starting position;
   f) holding said molten material inside said plurality of mold cavities until said molten material cools and solidifies into molded articles; and
   g) ejecting said molded articles from said injection molding machine.

34. An injection molding apparatus comprising:
   a mold having at least two mold cavities;
   a molten material inlet system in communication with said at least two mold cavities;
   at least two valves in said molten material inlet, wherein each of said at least two valves are associated with one of said mold cavities; and
   a controller adapted to sequentially inject molten material into said mold cavities,
   wherein said controller is further adapted to regulate an injection pressure that is applied to the molten material, said injection pressure being substantially eliminated prior to the injection of molten material into each of said mold cavities.

35. The apparatus of claim 34 wherein the mold cavities are multi-gate mold cavities.

36. The apparatus of claim 34 further comprising a stationary platen and a movable platen adapted to apply a clamping pressure to said mold having said at least two mold cavities.

37. The apparatus of claim 34 wherein said molten material inlet comprises at least two channels, each of said channels associated with one of said mold cavities, each of said channels in communication with and branching from a common inlet.

38. The apparatus of claim 37 wherein each of said channels includes a valve gate.

39. The apparatus of claim 34 wherein a valve gate is associated with each of said inlets.

40. The apparatus of claim 34 further comprising a clamping system, said clamping system applying a clamping pressure to said mold.

41. The apparatus of claim 40 wherein said clamping pressure is lower than the pressure that would be required by a non-sequential controller.

42. A controller for use with an injection molding device having a mold with at least two cavities, the controller comprising:

means for initiating a flow of molten material into a first mold cavity;

means for reducing the flow of molten material into said first cavity when said first mold cavity is substantially filled with molten material;

means for initiating a flow of molten material into a second mold cavity; and means for reducing the flow of molten material into said second cavity when said second mold cavity is substantially filled with molten material, means for substantially eliminating an injection pressure applied to said molten material when said first mold cavity is substantially filled and prior to initiating the flow of molten material into said second cavity.

43. The controller of claim 42, wherein said means for initiating and reducing the flow of molten material is responsive to a stroke sensor associated with a resin feeding screw, a timer or a pressure transducer associated with the first mold cavity and the second mold cavity.

44. The controller of claim 42, wherein said mold cavities are multi-gate mold cavities.

45. The controller of claim 42 wherein the flow of molten material into said first and second mold cavities is reduced when said first or second mold cavity is substantially filled with molten material and said molten material is held inside said cavity at a holding pressure for a period of time.

* * * * *